US010450484B2

(12) United States Patent
Chen et al.

(10) Patent No.: US 10,450,484 B2
(45) Date of Patent: *Oct. 22, 2019

(54) ADHESIVE COMPOSITIONS CONTAINING FUNCTIONALIZED ETHYLENE/ALPHA-OLEFIN INTERPOLYMERS AND ROSIN-BASED TACKIFIERS

(71) Applicant: Dow Global Technologies LLC, Midland, MI (US)

(72) Inventors: Livia Li Wen Chen, Philadelphia, PA (US); Selim Yalvac, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 94 days.

This patent is subject to a terminal disclaimer.

(21) Appl. No.: 14/894,832

(22) PCT Filed: Jul. 24, 2014

(86) PCT No.: PCT/US2014/047929
§ 371 (c)(1),
(2) Date: Nov. 30, 2015

(87) PCT Pub. No.: WO2015/013472
PCT Pub. Date: Jan. 29, 2015

(65) Prior Publication Data
US 2016/0130477 A1 May 12, 2016

(30) Foreign Application Priority Data
Jul. 24, 2013 (WO) ................ PCT/CN2013/080036

(51) Int. Cl.
*C09J 7/30* (2018.01)
*C09J 7/29* (2018.01)
*C09J 11/08* (2006.01)
*C09J 151/06* (2006.01)
*C08L 51/06* (2006.01)
*C09J 193/04* (2006.01)

(52) U.S. Cl.
CPC ................ *C09J 7/29* (2018.01); *C08L 51/06* (2013.01); *C09J 11/08* (2013.01); *C09J 151/06* (2013.01); *C09J 193/04* (2013.01); *C09J 2201/122* (2013.01); *C09J 2400/283* (2013.01); *C09J 2423/04* (2013.01); *C09J 2423/106* (2013.01); *C09J 2467/006* (2013.01); *C09J 2491/006* (2013.01); *C09J 2493/00* (2013.01); *Y02P 20/582* (2015.11)

(58) Field of Classification Search
None
See application file for complete search history.

(56) References Cited

U.S. PATENT DOCUMENTS

| 4,207,220 A | 6/1980 | Godfrey |
| 4,284,541 A | 8/1981 | Takeda et al. |
| 5,278,272 A | 1/1994 | Lai et al. |
| 5,441,999 A | 8/1995 | Jarvis et al. |
| 5,458,982 A | 10/1995 | Godfrey |
| 5,525,689 A | 6/1996 | Tsutsui et al. |
| 5,763,516 A | 6/1998 | Godfrey |
| 6,008,262 A | 12/1999 | McKay et al. |
| 6,107,430 A * | 8/2000 | Dubois .............. C09J 123/0815 524/274 |
| 6,319,979 B1 * | 11/2001 | Dubois .............. C09J 123/0815 524/570 |
| 6,335,410 B1 | 1/2002 | Finlayson et al. |
| 6,399,191 B1 | 6/2002 | Wong |
| 6,858,667 B1 | 2/2005 | Flerlage et al. |
| 7,199,180 B1 * | 4/2007 | Simmons .................. B32B 7/12 524/271 |
| 7,223,314 B2 | 5/2007 | Martin et al. |
| 7,378,481 B1 | 5/2008 | Gong et al. |
| 7,645,829 B2 | 1/2010 | Tse et al. |
| 8,034,878 B2 | 10/2011 | Karjala et al. |
| 9,012,563 B2 | 4/2015 | Yalvac et al. |
| 9,120,888 B2 | 9/2015 | Karjala et al. |

(Continued)

FOREIGN PATENT DOCUMENTS

| CN | 103205210 A | 7/2013 |
| JP | 1990052668 | 11/1990 |

(Continued)

OTHER PUBLICATIONS

Technical Data Sheet, "Foral 105-E Ester of Hydrogenated Rosin", Eastman, Nov. 13, 2008.*

(Continued)

*Primary Examiner* — Anish P Desai
(74) *Attorney, Agent, or Firm* — Quarles & Brady LLP

(57) ABSTRACT

The invention provides a composition comprising the following components:

A) an anhydride and/or carboxylic acid functionalized ethylene/alpha-olefin interpolymer comprising the following properties:
  i) a melt viscosity (177° C.) less than, or equal to, 50,000 cP; and
  ii) a density from 0.855 to 0.895 g/cc;

B) a rosin-based tackifier; and wherein the tackifier is selected from the following:
  i) a partially hydrogenated glycerol ester;
  ii) a fully hydrogenated pentaerythritol ester;
  iii) a fully hydrogenated glycerol ester;
  iv) a non-hydrogenated ester with a Tg from 30° C. to 50° C.; or
  v) a combination thereof.

9 Claims, No Drawings

(56) References Cited

U.S. PATENT DOCUMENTS

| | | | |
|---|---|---|---|
| 2007/0282072 A1* | 12/2007 | Hoffmann | C09J 123/02 525/240 |
| 2010/0160497 A1* | 6/2010 | Karjala | C08F 8/00 524/13 |
| 2015/0087760 A1* | 3/2015 | Kanderski | C09J 123/20 524/291 |
| 2015/0166853 A1* | 6/2015 | Chen | C09J 123/0815 428/355 EN |
| 2016/0312088 A1* | 10/2016 | Brown | C09J 151/06 |

FOREIGN PATENT DOCUMENTS

| | | | | |
|---|---|---|---|---|
| JP | 1991046514 | 7/1991 | | |
| JP | 2008069295 | 3/2008 | | |
| WO | 2006004750 | 1/2006 | | |
| WO | 2007/146875 | 12/2007 | | |
| WO | WO 2013185340 A1 * | 12/2013 | | C09J 123/0815 |
| WO | WO 2013187968 A1 * | 12/2013 | | C09J 123/0815 |
| WO | 2015/013472 | 1/2015 | | |
| WO | 2015006456 | 1/2015 | | |
| WO | 2015/100349 | 7/2015 | | |
| WO | 2016/029006 | 2/2016 | | |

OTHER PUBLICATIONS

"Affinity GA Polyolefin Elastomers, Polyolefin Elastomer for Hot Melt Adhesives", Dow Chemicals, published Dec. 2012.*

Definition "Kraft" from Merriam-Webster Dictionary, retrived Jul. 21, 2017.*

Product data sheet "Pernnalyn 6110 Synthetic Resin", Eastman, Dec. 2, 2018. (Year: 2018).*

International Search Report and Written Opinion of the International Searching Authority for PCT/CN2013,080036, dated 2014, pp. 1-10.

International Search Report and Written Opinion of the International Searching Authority for PCT/US2014/047929, dated 2014, pp. 1-7.

International Preliminary Report on Patentability for PCT/US2014/047929, dated 2016, pp. 1-5.

\* cited by examiner

ADHESIVE COMPOSITIONS CONTAINING FUNCTIONALIZED ETHYLENE/ALPHA-OLEFIN INTERPOLYMERS AND ROSIN-BASED TACKIFIERS

REFERENCE TO RELATED APPLICATIONS

This application claims the benefit of International Application No. PCT/CN13/080036, filed Jul. 24, 2013.

BACKGROUND

In the adhesive industry, single site catalyzed polyolefin elastomers have generally been formulated with hydrogenated (H2HCRs) or fully aliphatic tackifiers for hot melt adhesives (HMA), to achieve superior adhesive performance. However, hydrogenated tackifiers are expensive to produce, and are currently in tight supply. Readily abundant rosin-based tackifiers (tackifiers derived from rosin) are lower in cost than H2HCRs tackifiers. There is a need for new adhesive compositions containing rosin-based tackifiers, and which have improved heat resistance and flexibility at room temperature and low temperatures (−17° C.).

Adhesive formulations are disclosed in the following references: U.S. Pat. Nos. 5,763,516, 5,441,999, 7,223,814, 7,645,829, 6,858,667, 5,458,982, 4,284,541, 7,645,829; International Publication No. WO2007146875; JP3046514B (Abstract), JP2052668B (Abstract), JP1029830B (Abstract), JP2008069295A (Abstract), JP61181882A (Abstract), JP55066981A (Abstract). However, as discussed above, there is a need for new adhesive compositions containing rosin-based tackifiers. There is a further need for such compositions that have improved heat resistance and flexibility at room temperature and low temperatures (−17° C.). These needs have been met by the following invention.

SUMMARY OF THE INVENTION

The invention provides a composition comprising the following components:
A) an anhydride and/or carboxylic acid functionalized ethylene/alpha-olefin interpolymer comprising the following properties:
   i) a melt viscosity (177° C.) less than, or equal to, 50,000 cP; and
   ii) a density from 0.855 to 0.895 g/cc;
B) a rosin-based tackifier; and
wherein the tackifier is selected from the following:
   i) a partially hydrogenated glycerol ester;
   ii) a fully hydrogenated pentaerythritol ester;
   iii) a fully hydrogenated glycerol ester;
   iv) a non-hydrogenated ester with a Tg from 30° C. to 50° C.; or
   v) a combination thereof.

DETAILED DESCRIPTION

As discussed above, the invention provides a composition comprising the following components:
A) an anhydride and/or carboxylic acid functionalized ethylene/alpha-olefin interpolymer comprising the following properties:
   i) a melt viscosity (177° C.) less than, or equal to, 50,000 cP; and
   ii) a density from 0.855 to 0.895 g/cc;
B) a rosin-based tackifier; and
wherein the tackifier is selected from the following:
   i) a partially hydrogenated glycerol ester;
   ii) a fully hydrogenated pentaerythritol ester;
   iii) a fully hydrogenated glycerol ester;
   iv) a non-hydrogenated ester with a Tg from 30° C. to 50° C., further from 32° C. to 48° C., further from 34° C. to 46° C., further from 36° C. to 44° C.; or
   v) a combination thereof.

The inventive composition may comprise a combination of two or more embodiments as described herein.

In one embodiment, the tackifier is selected from the following:
   ii) a fully hydrogenated pentaerythritol ester;
   iii) a fully hydrogenated glycerol ester;
   iv) a non-hydrogenated ester with a Tg from 30° C. to 50° C., further from 32° C. to 48° C., further from 34° C. to 46° C., further from 36° C. to 44° C.; or
   v) a combination thereof.

In one embodiment, the tackifier is selected from the following:
   i) a partially hydrogenated glycerol ester;
   ii) a fully hydrogenated pentaerythritol ester;
   iv) a non-hydrogenated ester with a Tg from 30° C. to 50° C., further from 32° C. to 48° C., further from 34° C. to 46° C., further from 36° C. to 44° C.; or
   v) a combination thereof.

In one embodiment, the tackifier is selected from the following:
   i) a partially hydrogenated glycerol ester;
   ii) a fully hydrogenated pentaerythritol ester;
   iii) a fully hydrogenated glycerol ester; or
   v) a combination thereof.

In one embodiment, the tackifier is selected from the following:
   i) a partially hydrogenated glycerol ester;
   iii) a fully hydrogenated glycerol ester;
   iv) a non-hydrogenated ester with a Tg from 30° C. to 50° C., further from 32° C. to 48° C., further from 34° C. to 46° C., further from 36° C. to 44° C.; or
   v) a combination thereof.

In one embodiment, the tackifier is selected from the following:
   i) a partially hydrogenated glycerol ester;
   ii) a fully hydrogenated pentaerythritol ester; or
   v) a combination thereof.

In one embodiment, the tackifier is selected from the following:
   ii) a fully hydrogenated pentaerythritol ester;
   iii) a fully hydrogenated glycerol ester; or
   v) a combination thereof.

In one embodiment, the tackifier is selected from the following:
   i) a partially hydrogenated glycerol ester;
   iii) a fully hydrogenated glycerol ester; or
   v) a combination thereof.

In one embodiment, the tackifier is selected from the following:
   i) a partially hydrogenated glycerol ester;
   iv) a non-hydrogenated ester with a Tg from 30° C. to 50° C., further from 32° C. to 48° C., further from 34° C. to 46° C., further from 36° C. to 44° C.; or
   v) a combination thereof.

In one embodiment, the tackifier is selected from the following:
ii) a fully hydrogenated pentaerythritol ester;
iv) a non-hydrogenated ester with a Tg from 30° C. to 50° C., further from 32° C. to 48° C., further from 34° C. to 46° C., further from 36° C. to 44° C.; or
v) a combination thereof.

In one embodiment, the tackifier is selected from the following:
iii) a fully hydrogenated glycerol ester;
iv) a non-hydrogenated ester with a Tg from 30° C. to 50° C., further from 32° C. to 48° C., further from 34° C. to 46° C., further from 36° C. to 44° C.; or
v) a combination thereof.

In one embodiment, the tackifier is selected from i) a partially hydrogenated glycerol ester.

In one embodiment, the tackifier is selected from ii) a fully hydrogenated pentaerythritol ester.

In one embodiment, the tackifier is selected from iii) a fully hydrogenated glycerol ester.

In one embodiment, the tackifier is selected from iv) a non-hydrogenated ester with a Tg from 30° C. to 50° C., further from 32° C. to 48° C., further from 34° C. to 46° C., further from 36° C. to 44° C.

The tackifier of component B may comprise a combination of two or more embodiments described herein.

In one embodiment, the weight ratio of component A to component B (A/B) is from 0.50 to 2.00, further from 0.70 to 1.80, and further from 0.80 to 1.60.

In one embodiment, the composition comprises ≥70 weight percent, further ≥72 weight percent, and further ≥75 weight percent, of the sum weight of component A and component B, based on the weight of the composition.

In one embodiment, the composition has a melt viscosity (at 177° C.) from 100 to 2000 mPa·s, further from 200 to 1500 mPa·s, further from 300 to 1000 mPa·s.

In one embodiment, component A is present in an amount from 30 to 60 weight percent, based on the weight of the composition.

In one embodiment, the composition comprises less than 1000 ppm, further less than 500 ppm of an alkylacrylate copolymer, based on the weight of the composition.

In one embodiment, the composition does not comprise an alkylacrylate copolymer.

In one embodiment, the composition comprises less than 1000 ppm, further less than 500 ppm of a propylene-based polymer, based on the weight of the composition.

In one embodiment, the composition does not comprise a propylene-based polymer.

In one embodiment, component A is an anhydride and/or carboxylic acid functionalized ethylene/alpha-olefin copolymer, and further an anhydride and/or carboxylic acid grafted ethylene/alpha-olefin copolymer. Preferred α-olefins include, but are not limited to, C3-C20 α-olefins, and preferably C3-C10 α-olefins. More preferred α-olefins include propylene, 1-butene, 1-pentene, 1-hexene, 1-heptene and 1-octene, and more preferably include propylene, 1-butene, 1-hexene and 1-octene.

In one embodiment, the anhydride and/or carboxylic acid functionalized ethylene/alpha-olefin interpolymer of component A has a density greater than, or equal to, 0.857 g/cc, further greater than, or equal to, 0.860 g/cc, add further greater than, or equal to, 0.865 g/cc. In a further embodiment, the anhydride and/or carboxylic acid functionalized ethylene/alpha-olefin interpolymer is an anhydride and/or carboxylic acid functionalized ethylene/α-olefin copolymer. Some preferred α-olefins are discussed above.

In one embodiment, the anhydride and/or carboxylic acid functionalized ethylene/alpha-olefin interpolymer of component A has a density less than, or equal to, 0.892 g/cc, further less than, or equal to, 0.890 g/cc, and further less than, or equal to, 0.885 g/cc. In a further embodiment, the anhydride and/or carboxylic acid functionalized ethylene/alpha-olefin interpolymer is an anhydride and/or carboxylic acid functionalized ethylene/α-olefin copolymer. Some preferred α-olefins are discussed above.

In one embodiment, the anhydride and/or carboxylic acid functionalized ethylene/alpha-olefin interpolymer of component A has a density from 0.855 g/cc to 0.890 g/cc, further from 0.855 g/cc to 0.885 g/cc, and further from 0.855 g/cc to 0.880 g/cc (1 cc=1 cm$^3$). In a further embodiment, the anhydride and/or carboxylic acid functionalized ethylene/alpha-olefin interpolymer is an anhydride and/or carboxylic acid functionalized ethylene/α-olefin copolymer. Some preferred α-olefins are discussed above.

In one embodiment, the anhydride and/or carboxylic acid functionalized ethylene/alpha-olefin interpolymer of component A has a density from 0.857 g/cc to 0.892 g/cc, further from 0.860 g/cc to 0.890 g/cc, and further from 0.865 g/cc to 0.885 g/cc. In a further embodiment, the anhydride and/or carboxylic acid functionalized ethylene/alpha-olefin interpolymer is an anhydride and/or carboxylic acid functionalized ethylene/α-olefin copolymer. Some preferred α-olefins are discussed above.

If the density of component A is greater than 0.895 g/cc, than the adhesion of the final composition is reduced because of the increased rigidity of the polymer.

In one embodiment, the anhydride and/or carboxylic acid functionalized ethylene/alpha-olefin interpolymer of Component A comprises greater than, or equal to, 0.5 weight percent, further greater than, or equal to, 0.7 weight percent, further greater than, or equal to, 0.9 weight percent, of the anhydride and/or carboxylic acid functionality, based on the weight of the polymer. In a further embodiment, the anhydride and/or carboxylic acid functionalized ethylene/alpha-olefin interpolymer is an anhydride and/or carboxylic acid functionalized ethylene/α-olefin copolymer. Some preferred α-olefins are discussed above.

In one embodiment, the anhydride and/or carboxylic acid functionalized ethylene/alpha-olefin interpolymer of Component A comprises from 0.9 to 1.5 weight percent, further from 0.9 to 1.4 weight percent, further from 0.9 to 1.3 weight percent of the anhydride and/or carboxylic acid functionality, based on the weight of the polymer. In a further embodiment, the anhydride and/or carboxylic acid functionalized ethylene/alpha-olefin interpolymer is an anhydride and/or carboxylic acid functionalized ethylene/α-olefin copolymer. Some preferred α-olefins are discussed above.

In one embodiment, the anhydride and/or carboxylic acid functionalized ethylene/alpha-olefin interpolymer of Component A has a melt viscosity less than, or equal to, 40,000 cP, further less than, or equal to, 30,000 cP, further less than, or equal to, 20,000 cP, and further less than, or equal to, 15,000 cP, at 350° F. (177° C.). In a further embodiment, the anhydride and/or carboxylic acid functionalized ethylene/alpha-olefin interpolymer is an anhydride and/or carboxylic acid functionalized ethylene/α-olefin copolymer. Some preferred α-olefins are discussed above.

In one embodiment, anhydride and/or carboxylic acid functionalized ethylene/alpha-olefin interpolymer of Component A has a melt viscosity greater than, or equal to, 2,000 cP, further greater than, or equal to, 3,000 cP, further greater than, or equal to, 4,000 cP, and further greater than, or equal to, 5,000 cP, at 350° F. (177° C.). In a further embodiment, the anhydride and/or carboxylic acid functionalized ethylene/alpha-olefin interpolymer is an anhydride and/or carboxylic acid functionalized ethylene/α-olefin copolymer. Some preferred α-olefins are discussed above.

In one embodiment, the anhydride and/or carboxylic acid functionalized ethylene/alpha-olefin interpolymer of component A has a melt viscosity from 2,000 cP to 50,000 cP, further from 3,000 cP to 40,000 cP, further from 4,000 cP to 30,000 cP, at 350° F. (177° C.), and further from 5,000 cP to 20,000 cP, at 350° F. (177° C.). In a further embodiment, the anhydride and/or carboxylic acid functionalized ethylene/alpha-olefin interpolymer is an anhydride and/or carboxylic acid functionalized ethylene/α-olefin copolymer. Some preferred α-olefins are discussed above.

In one embodiment, the anhydride and/or carboxylic acid functionalized ethylene/alpha-olefin interpolymer of component A has a molecular weight distribution (Mw/Mn) less than, or equal to, 5.0, further less than, or equal to, 4.0, further less than, or equal to, 3.0. In a further embodiment, the anhydride and/or carboxylic acid functionalized ethylene/alpha-olefin interpolymer is an anhydride and/or carboxylic acid functionalized ethylene/α-olefin copolymer. Some preferred α-olefins are discussed above.

In one embodiment, the anhydride and/or carboxylic acid functionalized ethylene/alpha-olefin interpolymer of component A has a molecular weight distribution (Mw/Mn) greater than, or equal to, 1.5, further greater than, or equal to, 2.0, and further greater than, or equal to, 2.5. In a further embodiment, the anhydride and/or carboxylic acid functionalized ethylene/alpha-olefin interpolymer is an anhydride and/or carboxylic acid functionalized ethylene/α-olefin copolymer. Some preferred α-olefins are discussed above.

In one embodiment, the anhydride and/or carboxylic acid functionalized ethylene/alpha-olefin interpolymer of component A has a molecular weight distribution (MWD) from 1.5 to 5.0, further from 2.0 to 4.0, further from 2.2 to 3.0. In a further embodiment, the anhydride and/or carboxylic acid functionalized ethylene/alpha-olefin interpolymer is an anhydride and/or carboxylic acid functionalized ethylene/α-olefin copolymer. Some preferred α-olefins are discussed above.

In one embodiment, the anhydride and/or carboxylic acid functionalized ethylene/alpha-olefin interpolymer of component A has a weight average molecular weight (Mw) less than, or equal to, 50,000 g/mole, further less than, or equal to, 40,000 g/mole, further less than, or equal to, 30,000 g/mole. In a further embodiment, the anhydride and/or carboxylic acid functionalized ethylene/alpha-olefin interpolymer is an anhydride and/or carboxylic acid functionalized ethylene/α-olefin copolymer. Some preferred α-olefins are discussed above.

In one embodiment, the anhydride and/or carboxylic acid functionalized ethylene/alpha-olefin interpolymer of component A has a weight average molecular weight (Mw) greater than, or equal to, 2000 g/mole, further greater than, or equal to, 3000 g/mole, further greater than, or equal to, 4000 g/mole. In a further embodiment, the anhydride and/or carboxylic acid functionalized ethylene/alpha-olefin interpolymer is an anhydride and/or carboxylic acid functionalized ethylene/α-olefin copolymer. Some preferred α-olefins are discussed above.

In one embodiment, the anhydride and/or carboxylic acid functionalized ethylene/alpha-olefin interpolymer of component A has a melt index (I2), or calculated melt index (I2), greater than, or equal to, 300 g/10 min, further greater than, or equal to, 400 g/10 min, and more further greater than, or equal to, 500 g/10 min. In a further embodiment, the anhydride and/or carboxylic acid functionalized ethylene/alpha-olefin interpolymer is an anhydride and/or carboxylic acid functionalized ethylene/α-olefin copolymer. Some preferred α-olefins are discussed above.

In one embodiment, the anhydride and/or carboxylic acid functionalized ethylene/alpha-olefin interpolymer of component A has a melt index (I2), or calculated melt index (I2), less than, or equal to, 1500 g/10 min, further less than, or equal to, 1200 g/10 min, and more further less than, or equal to, 1000 g/10 min. In a further embodiment, the anhydride and/or carboxylic acid functionalized ethylene/alpha-olefin interpolymer is an anhydride and/or carboxylic acid functionalized ethylene/α-olefin copolymer. Some preferred α-olefins are discussed above.

In one embodiment, the anhydride and/or carboxylic acid functionalized ethylene/alpha-olefin interpolymer of component A has a percent crystallinity of less than, or equal to, 40 percent, further less than, or equal to, 35 percent, further less than, or equal to, 30 percent, further less than, or equal to, 25 percent, and further less than, or equal to, 20 percent, as determined by DSC. In a further embodiment, the anhydride and/or carboxylic acid functionalized ethylene/alpha-olefin interpolymer is an anhydride and/or carboxylic acid functionalized ethylene/α-olefin copolymer. Some preferred α-olefins are discussed above.

In one embodiment, the anhydride and/or carboxylic acid functionalized ethylene/alpha-olefin interpolymer of component A has a percent crystallinity of greater than, or equal to, 2 percent, further greater than, or equal to, 5 percent, and further greater than, or equal to, 10 percent, as determined by DSC. In a further embodiment, the anhydride and/or carboxylic acid functionalized ethylene/alpha-olefin interpolymer is an anhydride and/or carboxylic acid functionalized ethylene/α-olefin copolymer. Some preferred α-olefins are discussed above.

Suitable functionalized copolymers include MAH-grafted copolymers (for example, AFFINITY GA 1000R Polyolefin Plastomers, available from The Dow Chemical Company).

An anhydride and/or carboxylic acid functionalized ethylene/alpha-olefin interpolymer of component A may comprise a combination of two or more embodiments as described herein.

An anhydride and/or carboxylic acid functionalized ethylene/alpha-olefin copolymer of component A may comprise a combination of two or more embodiments as described herein.

In one embodiment, the composition further comprises component C) an ethylene/alpha-olefin interpolymer, and further an ethylene/alpha-olefin copolymer. Preferred α-olefins include, but are not limited to, C3-C20 α-olefins, and preferably C3-C10 α-olefins. More preferred α-olefins include propylene, 1-butene, 1-pentene, 1-hexene, 1-heptene and 1-octene, and more preferably include propylene, 1-butene, 1-hexene and 1-octene.

In one embodiment, the ethylene/alpha-olefin interpolymer, and further copolymer, of component C, has a melt viscosity less than, or equal to, 40,000 cP, further less than, or equal to, 30,000 cP, further less than, or equal to, 20,000 cP, and further less than, or equal to, 10,000 cP, at 350° F. (177° C.). Preferred alpha-olefins are discussed above.

In one embodiment, ethylene/alpha-olefin interpolymer, and further copolymer, of component C, has a melt viscosity greater than, or equal to, 2,000 cP, further greater than, or equal to, 3,000 cP, further greater than, or equal to, 4,000 cP, and further greater than, or equal to, 5,000 cP, at 350° F. (177° C.). Preferred alpha-olefins are discussed above.

In one embodiment, the ethylene/alpha-olefin interpolymer, and further copolymer, of component C, has a melt viscosity from 2,000 cP to 40,000 cP, further from 3,000 cP to 30,000 cP, further from 4,000 cP to 20,000 cP, at 350° F. (177° C.), and further from 5,000 cP to 10,000 cP, at 350° F. (177° C.). Preferred alpha-olefins are discussed above.

In one embodiment, the ethylene/alpha-olefin interpolymer, and further copolymer, of component C, has a molecular weight distribution (Mw/Mn) less than, or equal to, 3.5, further less than, or equal to, 3.0, further less than, or equal to, 2.5, and further less than, or equal to, 2.3. In a further embodiment, the ethylene/alpha-olefin interpolymer is an ethylene/α-olefin copolymer. Preferred alpha-olefins are discussed above.

In one embodiment, the ethylene/alpha-olefin interpolymer, and further copolymer, of component C, has a molecular weight distribution (Mw/Mn) greater than, or equal to, 1.1, further greater than, or equal to, 1.3, further greater than, or equal to, 1.5, and further greater than, or equal to, 1.7. In a further embodiment, the ethylene/alpha-olefin interpolymer is an ethylene/α-olefin copolymer. Preferred alpha-olefins are discussed above.

In one embodiment, the ethylene/alpha-olefin interpolymer, and further copolymer, of component C, has a weight average molecular weight distribution (Mw) less than, or equal to, 40,000 g/mole, further less than, or equal to, 30,000 g/mole, further less than, or equal to, 25,000 g/mole. Preferred alpha-olefins are discussed above.

In one embodiment, the ethylene/alpha-olefin interpolymer, and further copolymer, of component C, has a weight average molecular weight distribution (Mw) greater than, or equal to, 2000 g/mole, further greater than, or equal to, 3000 g/mole, further greater than, or equal to, 4000 g/mole. Preferred alpha-olefins are discussed above.

In one embodiment, the ethylene/alpha-olefin interpolymer, and further copolymer, of component C, has a melt index (I2 or MI), or calculated melt index (I2 or MI), greater than, or equal to, 400 g/10 min, further greater than, or equal to, 600 g/10 min, and more further greater than, or equal to, 800 g/10 min Preferred alpha-olefins are discussed above.

In one embodiment, the ethylene/alpha-olefin interpolymer, and further copolymer, of component C, has a melt index (I2 or MI), or calculated melt index (I2 or MI), less than, or equal to, 2000 g/10 min, further less than, or equal to, 1500 g/10 min, and further less than, or equal to, 1200 g/10 min. Preferred alpha-olefins are discussed above.

In one embodiment, the ethylene/alpha-olefin interpolymer, and further copolymer, of component C, has a percent crystallinity of less than, or equal to, 40 percent, further less than, or equal to, 30 percent, and further less than, or equal to, 20 percent, as determined by DSC. Preferred alpha-olefins are discussed above.

In one embodiment, the ethylene/alpha-olefin interpolymer, and further copolymer, of component C, has a percent crystallinity of greater than, or equal to, 2 percent, further greater than, or equal to, 5 percent, and further greater than, or equal to, 10 percent, as determined by DSC. Preferred alpha-olefins are discussed above.

In one embodiment, the ethylene/alpha-olefin interpolymer, and further copolymer, of component C, has a density greater than, or equal to, 0.855 g/cc, further greater than, or equal to, 0.860 g/cc, add further greater than, or equal to, 0.865 g/cc. Preferred alpha-olefins are discussed above.

In one embodiment, the ethylene/alpha-olefin interpolymer, and further copolymer, of component C, has a density less than, or equal to, 0.900 g/cc, further less than, or equal to, 0.895 g/cc, further less than, or equal to, 0.890 g/cc, and further less than, or equal to, 0.885 g/cc. Preferred alpha-olefins are discussed above. Preferred alpha-olefins are discussed above.

In one embodiment, the ethylene/alpha-olefin interpolymer, and further copolymer, of component C, has a density from 0.855 g/cm$^3$ to 0.900 g/cm$^3$, further from 0.860 g/cm$^3$ to 0.895 g/cm$^3$, and further from 0.865 g/cm$^3$ to 0.890 g/cm$^3$. Preferred alpha-olefins are discussed above. Preferred alpha-olefins are discussed above.

In one embodiment, the ethylene/α-olefin interpolymer of component C is a homogeneously branched linear interpolymer, and further a copolymer, or a homogeneous branched substantially linear interpolymer, and further a copolymer. Preferred alpha-olefins are discussed above.

In one embodiment, the ethylene/α-olefin interpolymer of component C is a homogeneously branched linear interpolymer, further a copolymer.

In one embodiment, the ethylene/α-olefin interpolymer of component C is a homogeneous branched substantially linear interpolymer, further a copolymer.

Some examples of ethylene/α-olefin copolymers include AFFINITY GA Polyolefin Plastomers, available from The Dow Chemical Company, and LICOCENE Performance Polymers from Clariant. Other examples of ethylene/α-olefin interpolymers, suitable for the invention, include the ultra low molecular weight ethylene polymers described in U.S. Pat. Nos. 6,335,410, 6,054,544 and 6,723,810, each fully incorporated herein by reference.

In one embodiment, the composition comprises less than, or equal to, 40 weight percent, further less than, or equal to, 30 weight percent, further less than, or equal to, 20 weight percent of Component C, based on the sum weight of components A and C.

In one embodiment, the composition comprises greater than, or equal to, 2 weight percent, further greater than, or equal to, 5, further greater than, or equal to, 10 weight percent of Component C, based on the sum weight of components A and C.

In one embodiment, the composition comprises less than, or equal to, 30 weight percent, further less than, or equal to, 25, further less than, or equal to, 20 weight percent of Component C, based on the weight of the composition.

In one embodiment, the composition comprises greater than, or equal to, 1 weight percent, further greater than, or equal to, 2, further greater than, or equal to, 5 weight percent of Component C, based on the weight of the composition.

An ethylene/alpha-olefin interpolymer of component C may comprise a combination of two or more embodiments as described herein.

An ethylene/alpha-olefin copolymer of component C may comprise a combination of two or more embodiments as described herein.

An inventive composition may comprise a combination of two or more embodiments described herein.

The anhydride and/or carboxylic acid functionalized ethylene/alpha-olefin interpolymer of component A may comprise a combination of two or more embodiments described herein.

The tackifier of component B may comprise a combination of two or more embodiments described herein.

The invention also provides an article comprising at least one component formed from an inventive composition.

In one embodiment, the article further comprises a substrate.

In one embodiment, the substrate is selected from the group consisting of the following: a coated substrate, a recycled paper, and combinations thereof.

In one embodiment, the substrate is selected from the group consisting of the following: a wax coated Kraft or carton, a polyethylene coated Kraft or carton, a BOPP film laminated Kraft or carton, a polypropylene (PP) film laminated Kraft or carton, a PET film laminated Kraft or carton, a clay coated Kraft or carton, a lacquer coated Kraft or carton, and combinations thereof.

In a further embodiment, the substrate is selected from the group consisting of the following:

(1) Wax coated Kraft or carton,
(2) Polyethylene coated Kraft or carton,
(3) BOPP film laminated Kraft or carton,
(4) Polypropylene (PP) film laminated Kraft or carton,
(5) PET film laminated Kraft or carton,
(6) Clay coated Kraft or carton,
(7) Lacquer coated Kraft or carton, and
(8) Combinations thereof (for example, (1) followed by (2) or (1) or (4)).

An inventive article may comprise a combination of two or more embodiments as described herein.

It has been discovered that the inventive compositions have excellent heat resistance and flexibility at room temperature and low temperature (−17° C.). It has also been discovered that the inventive compositions provide better overall adhesive performance, especially for bonding at a wide range of temperature (freezer to microwave), and flexibility, compared to conventional adhesives based on EVA and polyolefin or olefin-based polymer.

Ethylene/α-Olefin Interpolymers (Based Polymers for Component A)

The base polymer used to form the anhydride and/or carboxylic acid functionalized ethylene/α-olefin interpolymer is an ethylene/α-olefin interpolymer. The following embodiments also may apply to the ethylene/alpha-olefin interpolymer of component C.

In one embodiment, the ethylene/α-olefin interpolymer, is an ethylene/α-olefin copolymer. Preferred α-olefins include, but are not limited to, C3-C20 α-olefins, and further C3-C10 α-olefins. More preferred α-olefins include propylene, 1-butene, 1-pentene, 1-hexene, 1-heptene and 1-octene, and more further include propylene, 1-butene, 1-hexene and 1-octene.

In one embodiment, the ethylene/α-olefin interpolymer has a melt viscosity less than, or equal to, 50,000 cP, further less than, or equal to, 40,000 cP, and further less than, or equal to, 30,000 cP, at 350° F. (177° C.). In a further embodiment, the ethylene/α-olefin interpolymer is an ethylene/α-olefin copolymer. Suitable α-olefins are discussed above.

In one embodiment, ethylene/α-olefin interpolymer has a melt viscosity greater than, or equal to, 2,000 cP, further greater than, or equal to, 4,000 cP, more further greater than, or equal to, 5,000 cP, at 350° F. (177° C.). In a further embodiment, the ethylene/α-olefin interpolymer is an ethylene/α-olefin copolymer. Suitable α-olefins are discussed above.

In one embodiment, the ethylene/α-olefin interpolymer has a melt viscosity from 2,000 cP to 20,000 cP, further from 4,000 cP to 16,000 cP, and further from 5,000 cP to 10,000 cP, at 350° F. (177° C.). In a further embodiment, the ethylene/α-olefin interpolymer is an ethylene/α-olefin copolymer. Suitable α-olefins are discussed above.

In one embodiment, the ethylene/α-olefin interpolymer has a molecular weight distribution (Mw/Mn) less than, or equal to, 5.0, and further less than, or equal to, 4.0, and further less than, or equal to, 3.0. Further, the ethylene/α-olefin interpolymers have a molecular weight distribution from 1.1 to 3.5, and further from 1.1 to 3.0, and further from 1.1 to 2.5. In a further embodiment, the ethylene/α-olefin interpolymer is an ethylene/α-olefin copolymer. Suitable α-olefins are discussed above.

In one embodiment, the ethylene/α-olefin interpolymer has a melt index (I2 or MI), or calculated melt index (I2 or MI), greater than, or equal to, 500 g/10 min, further greater than, or equal to, 800 g/10 min, and further greater than, or equal to, 1000 g/10 min. In a further embodiment, the ethylene/α-olefin interpolymer is an ethylene/α-olefin copolymer. Suitable α-olefins are discussed above.

In one embodiment, the ethylene/α-olefin interpolymer has a melt index (I2 or MI), or calculated melt index (I2 or MI), less than, or equal to, 2500 g/10 min, further less than, or equal to, 2000 g/10 min, and further less than, or equal to, 1500 g/10 min. In a further embodiment, the ethylene/α-olefin interpolymer is an ethylene/α-olefin copolymer. Suitable α-olefins are discussed above.

In one embodiment, the ethylene/α-olefin interpolymer has a percent crystallinity of less than, or equal to, 40 percent, further less than, or equal to, 30 percent, and further less than, or equal to, 20 percent, as determined by DSC. In a further embodiment, the ethylene/α-olefin interpolymer is an ethylene/α-olefin copolymer. Suitable α-olefins are discussed above.

In one embodiment, the ethylene/α-olefin interpolymer has a percent crystallinity of greater than, or equal to, 2 percent, further greater than, or equal to, 5 percent, and further greater than, or equal to, 10 percent, as determined by DSC. In a further embodiment, the ethylene/α-olefin interpolymer is an ethylene/α-olefin copolymer. Suitable α-olefins are discussed above.

In one embodiment, the ethylene/α-olefin interpolymer has a percent crystallinity from 2 to 30 percent, further from 5 to 25 percent, and further from 10 to 20 percent, as determined by DSC. In a further embodiment, the ethylene/α-olefin interpolymer is an ethylene/α-olefin copolymer. Suitable α-olefins are discussed above.

In one embodiment, the ethylene/α-olefin interpolymer has a density greater than, or equal to, 0.855 g/cc, further greater than, or equal to, 0.860 g/cc, further greater than, or equal to, 0.865 g/cc. In a further embodiment, the ethylene/α-olefin interpolymer is an ethylene/α-olefin copolymer. Suitable α-olefins are discussed above.

In one embodiment, the ethylene/α-olefin interpolymer has a density less than, or equal to, 0.895 g/cc, further less than, or equal to, 0.890 g/cc, further less than, or equal to, 0.880 g/cc. In a further embodiment, the ethylene/α-olefin interpolymer is an ethylene/α-olefin copolymer. Suitable α-olefins are discussed above.

In one embodiment, the ethylene/α-olefin interpolymers has a density from 0.855 g/cm$^3$ to 0.890 g/cm$^3$, and further from 0.860 g/cm$^3$ to 0.885 g/cm$^3$, and further from 0.865 g/cm$^3$ to 0.880 g/cm$^3$. In a further embodiment, the ethylene/α-olefin interpolymer is an ethylene/α-olefin copolymer. Suitable α-olefins are discussed above.

Some examples of ethylene/α-olefin copolymers include AFFINITY GA Polyolefin Plastomers, available from The Dow Chemical Company, and LICOCENE Performance Polymers from Clariant. Other examples of ethylene/α-olefin polymers suitable for the invention include the ultra low molecular weight ethylene polymers described in U.S. Pat. Nos. 6,335,410, 6,054,544 and 6,723,810, each fully incorporated herein by reference.

In one embodiment, the ethylene/α-olefin interpolymer is a homogeneously branched linear interpolymer, and further a copolymer, or a homogeneous branched substantially linear interpolymer, and further a copolymer. Suitable α-olefins are discussed above.

In one embodiment, the ethylene/α-olefin interpolymer is a homogeneously branched linear interpolymer, and further a copolymer. Suitable α-olefins are discussed above.

In one embodiment, the ethylene/α-olefin interpolymer is a homogeneous branched substantially linear interpolymer, and further a copolymer. Suitable α-olefins are discussed above.

The terms "homogeneous" and "homogeneously-branched" are used in reference to an ethylene/α-olefin interpolymer, in which the α-olefin comonomer is randomly distributed within a given polymer molecule, and all of the polymer molecules have the same or substantially the same comonomer-to-ethylene ratio.

The homogeneously branched linear ethylene interpolymers are ethylene-based polymers, which lack measureable amounts of long chain branching, but do have short chain branches, derived from the comonomer polymerized into the interpolymer, and which are homogeneously distributed, both within the same polymer chain, and between different polymer chains. These ethylene/α-olefin interpolymers have a linear polymer backbone, no measurable long chain branching, and a narrow molecular weight distribution. This class of polymers is disclosed, for example, by Elston in U.S. Pat. No. 3,645,992, and subsequent processes to produce such polymers, using bis-metallocene catalysts, have been developed, as shown, for example, in EP 0 129 368; EP 0 260 999; U.S. Pat. Nos. 4,701,432; 4,937,301; 4,935,397; 5,055,438; and WO 90/07526; each incorporated herein by reference. As discussed, the homogeneously branched linear ethylene interpolymers lack long chain branching, just as is the case for the linear, low density polyethylene polymers or linear high density polyethylene polymers. Commercial examples of homogeneously branched linear ethylene/α-olefin interpolymers include TAFMER polymers from the Mitsui Chemical Company, and EXACT and EXCEED polymers from ExxonMobil Chemical Company.

The homogeneously branched substantially linear ethylene/α-olefin interpolymers are described in U.S. Pat. Nos. 5,272,236; 5,278,272; 6,054,544; 6,335,410 and 6,723,810; each incorporated herein by reference. The substantially linear ethylene/α-olefin interpolymers have long chain branching. The long chain branches have the same comonomer distribution as the polymer backbone, and can have about the same length as the length of the polymer backbone. "Substantially linear," typically, is in reference to a polymer that is substituted, on average, with "0.01 long chain branches per 1000 total carbons" to "3 long chain branches per 1000 total carbons." The length of a long chain branch is longer than the carbon length of a short chain branch, formed from the incorporation of one comonomer into the polymer backbone.

Some polymers may be substituted with "0.01 long chain branches per 1000 total carbons" to "3 long chain branch per 1000 total carbons," further from "0.01 long chain branches per 1000 total carbons" to "2 long chain branch per 1000 total carbons," and further from "0.01 long chain branches per 1000 total carbons" to "1 long chain branch per 1000 total carbons."

The substantially linear ethylene/α-olefin interpolymers form a unique class of homogeneously branched ethylene-based polymers. They differ substantially from the well-known class of conventional, homogeneously branched linear ethylene/α-olefin interpolymers, as discussed above, and, moreover, they are not in the same class as conventional heterogeneous "Ziegler-Natta catalyst polymerized" linear ethylene polymers (for example, ultra low density polyethylene (ULDPE), linear low density polyethylene (LLDPE) or high density polyethylene (HDPE), made, for example, using the technique disclosed by Anderson et al., in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

The homogeneously branched, substantially linear ethylene/α-olefin interpolymers useful in the invention have excellent processability, even though they have a relatively narrow molecular weight distribution. Surprisingly, the melt flow ratio (I 10/I2), according to ASTM D 1238, of the substantially linear ethylene interpolymers can be varied widely, and essentially independently of the molecular weight distribution (Mw/Mn or MWD). This surprising behavior is contrary to conventional homogeneously branched linear ethylene interpolymers, such as those described, for example, by Elston in U.S. Pat. No. 3,645,992, and heterogeneously branched, conventional "Ziegler-Natta polymerized," linear polyethylene interpolymers, such as those described, for example, by Anderson et al., in U.S. Pat. No. 4,076,698. Unlike substantially linear ethylene interpolymers, linear ethylene interpolymers (whether homogeneously or heterogeneously branched) have rheological properties, such that, as the molecular weight distribution increases, the I10/I2 value also increases.

Long chain branching can be determined by using 13C Nuclear Magnetic Resonance (NMR) spectroscopy, and can be quantified using the method of Randall (Rev. Macromol. Chem. Phys., C29 (2 &3), 1989, p. 285-297), the disclosure of which is incorporated herein by reference. Two other methods are Gel Permeation Chromatography, couple with a Low Angle Laser Light Scattering detector (GPCLALLS), and Gel Permeation Chromatography, coupled with a Differential Viscometer detector (GPC-DV). The use of these techniques for long chain branch detection, and the underlying theories, have been well documented in the literature. See, for example, Zimm, B. H. and Stockmayer, W. H., J. Chem. Phys., 17, 1301 (1949); and Rudin, A., Modern Methods of Polymer Characterization, John Wiley & Sons, New York (1991) pp. 103-112.

In contrast to "substantially linear ethylene polymer," "linear ethylene polymer" means that the polymer lacks measurable or demonstrable long chain branches, that is, the polymer is substituted with an average of less than 0.01 long chain branch per 1000 total carbons.

The ethylene/α-olefin interpolymer may comprise a combination of two or more embodiments as described herein.

The ethylene/α-olefin copolymer may comprise a combination of two or more embodiments as described herein.

Additives and Applications

Typically polymers used in the invention are treated with one or more stabilizers, for example, antioxidants, such as, for example, IRGANOX 1010, IRGANOX 1076, and IRGAFOS 168, now supplied by BASF. Polymers are typically treated with one or more stabilizers before an extrusion or other melt processes. Other polymeric additives include, but are not limited to, ultraviolet light absorbers, antistatic agents, pigments and dyes, nucleating agents, fillers, slip agents, fire retardants, plasticizers, processing aids, lubricants, stabilizers, smoke inhibitors, viscosity control agents and anti-blocking agents. The inventive compositions may also contain one or more thermoplastic polymers.

The inventive compositions may further comprise an oil. Oils are typically employed to reduce the viscosity of the adhesive. When employed, oils will be typically present in an amount less than 50 weight percent, preferably less than 40 weight percent, and more preferably less than 35 weight percent, based on the weight of the composition. Exemplary classes of oils include, but are not limited to, white mineral oil (such as KAYDOL oil available from Witco), and SHELLFLEX 371 naphthenic oil (available from Shell Oil Company) and CALSOL 5550 (napthenic oil from Calumet Lubricants).

The inventive compositions may further comprise a wax. Waxes include, but are not limited to, paraffin waxes, microcrystalline waxes, high density, low molecular weight polyethylene waxes, polypropylene waxes, thermally degraded waxes, by-product polyethylene waxes, Fischer-Tropsch waxes, oxidized Fischer-Tropsch waxes, and functionalized waxes, such as hydroxy stearamide waxes and fatty amide waxes. It is common in the art to use the terminology "synthetic high melting point waxes" to include high density, low molecular weight polyethylene waxes, by-product polyethylene waxes and Fischer-Tropsch waxes. Other waxes also include those described in U.S. Pat. Nos. 6,335,410; 6,054,544 and 6,723,810; which are all incorporated herein by reference. Preferred waxes include, but are not limited to, SASOL waxes (e.g., SASOLWAX H1 from Sasol Wax Company), and Fischer-Tropsch waxes.

In one embodiment, the composition comprises from 10 to 40 weight percent, and further from 10 to 35 weight percent, and further from 10 to 30 weight percent of a wax, based on the weight of the composition.

The inventive compositions may be prepared by standard melt blending procedures. In particular, the maleic anhydride-grafted polymer or blend, tackifier(s) and other components may be melt blended, until a homogeneous mix is obtained. Any mixing method producing a homogeneous blend, without degrading the adhesive components, is satisfactory, such as a vessel equipped with a stirrer, and an optional heating mechanism. The adhesives can be provided in forms, such as pellets, pillows, chiclets, drags, or any other desired configurations.

The inventive compositions may also be used in a variety of application, including, but not limited to, case and carton sealing, automotive, graphic arts, nonwovens, panel assembly, high performance tapes, contact hot melt adhesives, paperboard coatings, inks, personal care and cosmetic products, sealants, color and additive concentrates, carpet-tape adhesives, woodworking adhesives, and profile wrap adhesives.

Definitions

Unless stated to the contrary, all test methods are current as of the filing date of this disclosure.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities, for example, catalyst residues, may be incorporated into and/or within the polymer.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomers.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene/α-olefin interpolymer," as used herein, refers to an interpolymer that comprises, in polymerized form, a majority amount of ethylene monomer (based on the weight of the interpolymer), and at least one α-olefin.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term, "propylene-based polymer," as used herein, refers to a polymer that comprises, in polymerized form, a majority amount of propylene monomer (based on the weight of the polymer), and optionally may comprise one or more comonomers.

The term "fully hydrogenated," as used herein, refers to a hydrogenation level greater than 90%. The term "partially hydrogenated," as used herein, refers to a hydrogenation level from 50% to 90%. The term "non-hydrogenated," as used herein, refers to a hydrogenation level less than 50%. The hydrogenation level can be determined by those skilled in the art, for example, by proton (1H) NMR.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Melt Viscosity

Melt viscosity is measured in accordance with ASTM D 3236 (350° F.), using a Brookfield Digital Viscometer (Model DV-III, version 3), and disposable aluminum sample chambers. The spindle used, in general, is a SC-31 hot-melt spindle, suitable for measuring viscosities in the range from 10 to 100,000 centipoise. The sample (polymer or adhesive composition) is poured into the chamber, which is, in turn, inserted into a Brookfield Thermoset, and locked into place. The sample chamber has a notch on the bottom that fits the bottom of the Brookfield Thermoset, to ensure that the chamber is not allowed to turn when the spindle is inserted and spinning. The sample (approximately 8-10 grams of resin) is heated to the required temperature, until the melted sample is about one inch below the top of the sample chamber. The viscometer apparatus is lowered, and the spindle submerged into the sample chamber. Lowering is continued, until the brackets on the viscometer align on the Thermoset. The viscometer is turned on, and set to operate at a shear rate, which leads to a torque reading in the range of 40 to 60 percent of the total torque capacity, based on the rpm output of the viscometer. Readings are taken every minute for about 15 minutes, or until the values stabilize, at which point, a final reading is recorded.

Melt Index

Melt index (I2, or MI) of an ethylene-based polymer is measured in accordance with ASTM D-1238, condition 190° C./02.16 kg. For high I2 polymers (I2 greater than, or equal to, 200 g/mole, melt index is preferably calculated from Brookfield viscosity as described in U.S. Pat. Nos. 6,335, 410; 6,054,544; 6,723,810. I2(190° C./2.16 kg)=3.6126 $[10^{log(\eta)-6.6928)/-1.1363}]$-9.31851, where η=melt viscosity, in cP, at 350° F. (177° C.).

Peel and Shear Strength

The peel adhesion fail temperature (PAFT) and shear adhesion failure temperature (SAFT) of the adhesives were tested using ASTM D-4498. Four samples (two for PAFT and two for SAFT) were put in a programmable oven, then "100 g weights" for PAFT, and "500 g weights" for SAFT, were attached to the samples. The test samples were equilibrated in an oven at 30° C., then the temperature of the oven was increased at a heating rate of 0.5° C./min. The failure time was recorded, and the failure temperature was calculated accordingly.

Two sheets of 6"×12" Kraft paper were used for lamination. Bottom sheet has two pieces of masking tape separated by 1" gap. The adhesive was spread by the bottom glass rod that is shimmed with tape. The top glass rod supplies compression. Silicone paper at the end was used to catch the excess adhesive. The final bond was defined by the two pieces of masking tape and was 1" wide. The molten adhesive was heated to 177° C., and poured onto the bottom sheet. The glass rods were then quickly drawn across to make the lamination. The laminated sheet was trimmed, and cut widthwise into "1" wide strips." These strips had a "1"×1" bond" in the center. The samples were conditioned for 24 hours at room temperature and 54 percent RH (Relative Humidity). Then the samples were placed in the oven, with 100 g in a peel mode, and 500 g in a shear mode. The oven temperature was increased at a rate of 30° C./h. The samples were hung from a switch that tripped when the samples failed, and the time and temperature were recorded by a computer. Two samples were tested for PAFT, and the average failure temperature recorded. Two samples were tested for SAFT, and the average failure temperature recorded.

Heat Stress

The heat stress resistance was measured according to the "Suggested Test Method for Determining the Heat Stress Resistance of Hot Melt Adhesives," method T-3006, prepared by the Institute of Packaging Professions (IoPP). To prepare one sample, two cardboard coupons (cut with flutes running in the long direction), having dimensions of 2"×3 3/16" and 2"×5 1/2," were bonded, by applying "0.00014 lb/in of adhesive" with an Olinger Bond Tester. The adhesive was applied perpendicular to the flutes, in the center of the shorter coupon, and the coupons were bonded, such that the adhesive was 3/4" from one end of the long coupon. Six replicates were made for each formulation. Samples were loaded into the sample holder, with the short coupon end aligned with the edge of the sample holder. The samples were held in place with the wide plate secured by wingnuts. A "200 g weight" was placed 3.94" from the bond. The weight was secured by placing the peg, on the weight, into a hole made in the long coupon. The sample holder was then placed into a convection oven, at a set temperature, for 24 hours. If at least 80% of the bonds do not fail, than the sample was considered to have passed heat resistance at the test temperature. The oven temperature was varied, until the maximum passing heat stress resistance was determined. All new bonded coupon samples were used for each test temperature (six samples for each formulation and test temperature).

Fiber Tear

The percentage of fiber tear of each adhesive sample was evaluated on regular cardboard (KRAFT cardboard) or hard to bond substrates (BOPP (Biaxially Oriented Polypropylene) film laminated Kraft or carton), at three different temperatures: room temperature, −17° C. and 60° C. The fiber tear results on these two different substrates were recorded. The adhesive was heated to 350° F./177° C., and was applied on the substrate cut into "1×3M (25×76 mm)" rectangular sheets. The adhesive to be tested was applied, running lengthwise, at about a "5 mm/0.2 in" wide strip, and was drawn down with a spatula or hot melt applicator. Then a second strip was applied within two seconds and held, with moderate pressure, for five seconds to laminate.

The bonds, conditioned for 24 hours at room temperature and 54 percent RH, were then pulled apart at the test temperatures of room temperature, −17° C. and 60° C. Each bond was tested immediately, after the conditioning period ended. The bond was torn by inserting the blade of a spatula under one corner to fold up the corner. The bond was then placed on a horizontal surface, with the side with the folded corner faced up. With the laminate held as near as possible to the source of heating or cooling, in order to maintain the conditioning temperature, the folded corner is manually pulled as rapidly, as possible, at roughly a 45 to 90 degree angle, relative to each sheet's lengthwise axis, to tear the adhesive bond. The percent of torn fiber was estimated (fiber tear or FT) in 25 percent increments; that is, 0 percent, 25 percent, 50 percent, 75 percent and 100 percent. Unless otherwise stated, the FT test is normally repeated on five replicate samples, and the average of these five samples reported.

Gel Permeation Chromatography

The average molecular weights and molecular weight distributions for ethylene-based polymers are determined with a chromatographic system, consisting of either a Polymer Laboratories Model PL-210 or a Polymer Laboratories Model PL-220. The column and carousel compartments are operated at 140° C. for ethylene-based polymers. The columns are three Polymer Laboratories 10-micron, Mixed-B columns. The solvent is 1,2,4-trichloro-benzene. The samples are prepared at a concentration of "0.1 gram of polymer" in "50 milliliters" of solvent. The solvent used to prepare the samples contains 200 ppm of butylated hydroxytoluene (BHT). Samples are prepared by agitating lightly, for two hours, at 160° C. The injection volume is "100 microliters," and the flow rate is 1.0 milliliters/minute. Calibration of the GPC column set is performed with narrow molecular weight distribution polystyrene standards, purchased from Polymer Laboratories (UK). The polystyrene standard peak molecular weights are converted to polyethylene molecular weights using the following equation (as described in Williams and Ward, J. Polym. Sci., Polym. Let., 6, 621 (1968)):

$$M_{polyethylene} = A \times (M_{polystyrene})^B,$$

where M is the molecular weight, A has a value of 0.4315 and B is equal to 1.0. Polyethylene equivalent molecular weight calculations were performed using VISCOTEK TriSEC software, Version 3.0. The molecular weights for propylene-based polymers can be determined using Mark-Houwink ratios according to ASTM D6474.9714-1, where, for polystyrene a=0.702 and log K=−3.9, and for polypropylene, a=0.725 and log K=−3.721. For propylene-based polymer samples, the column and carousel compartments are operated at 160° C.

Differential Scanning Calorimetry (DSC) for Polymers

Differential Scanning calorimetry (DSC) is used to measure crystallinity in ethylene (PE) based polymer samples and propylene (PP) based polymer samples. About five to eight milligrams of sample is weighed and placed in a DSC pan. The lid is crimped on the pan to ensure a closed atmosphere. The sample pan is placed in a DSC cell, and then heated, at a rate of approximately 10° C./min, to a temperature of 180V for PE (230° C. for PP). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (e.g., for PE, % cryst.=($H_f$/292 J/g)×100; and for PP, % cryst.=($H_f$/165 J/g)×100).

Unless otherwise stated, melting point(s) ($T_m$) and glass transition temperature (Tg) of each polymer is determined from the second heat curve obtained from DSC, as described above. The crystallization temperature ($T_c$) is measured from the first cooling curve.

Differential Scanning Calorimetry (DSC) for Tackifier Resins

Differential Scanning calorimetry (DSC) is used to measure glass transition temperature (Tg) for each tackifier resin. For this measurement, a DSC Q2000 instrument was employed. About five to eight milligrams of sample is weighed and placed in a DSC pan. The lid is crimped on the pan to ensure a closed atmosphere. The sample pan is placed in a DSC cell, and equilibrated at −20° C., then heated, at a rate of approximately 10° C./min, to a temperature of 100° C. The sample is kept at this temperature for three minutes. Then the sample is cooled at a rate of 10° C./min to −20° C., and kept isothermally at that temperature for three minutes. The sample is next heated at a rate of 10° C./min, to a temperature of 100V (second heat). Glass transition temperature (Tg) of tackifier resin is determined from the second heat curve.

Density

Density is measured in accordance with ASTM D-792. The density measured is a "quick density," meaning that the density is determined after one hour from the time of molding. Test samples are compression molded at a temperature of 20° C. higher than the melting point of polymer, and at a pressure of 10 MPa for five minutes (dimensions of molded sample: 50 $cm^2 \times 1$-2 mm).

Fourier Transform Infrared Spectroscopy (FTIR) Analysis—Maleic Anhydride Content.

The concentration of maleic anhydride is determined by the ratio of peak heights of the maleic anhydride at wave number 1791 $cm^{-1}$ to the polymer reference peak, which, in case of polyethylene, is at wave number 2019 $cm^{-1}$. Maleic anhydride content is calculated by multiplying this ratio with the appropriate calibration constant. The equation used for maleic grafted polyolefins (with reference peak for polyethylene) has the following form, as shown in Equation 1.

$$MAH(wt\,\%) = A^* \{[FTIR\ PeakArea@1791\ cm\text{-}1]/[FTIR\ PeakArea\ 2019\ cm\text{-}1] + B^*[FTIR\ PeakArea@1712\ cm\text{-}1]/[FTIR\_PeakArea@2019\ cm\text{-}1]\} \quad \text{(Eqn. 1)}$$

The calibration constant A can be determined using C13 NMR standards. The actual calibration constant may differ slightly, depending on the instrument and polymer. The second component at wave number 1712 $cm^{-1}$ accounts for the presence of maleic acid, which is negligible for freshly grafted material. Over time however, maleic anhydride is readily converted to maleic acid in the presence of moisture. Depending on surface area, significant hydrolysis can occur in just a few days under ambient conditions. The acid has a distinct peak at wave number 1712 $cm^{-1}$. The constant B in Equation 1 is a correction for the difference in extinction coefficients between the anhydride and acid groups.

The sample preparation procedure begins by making a pressing, typically 0.05 to 0.15 millimeters in thickness, in a heated press, between two protective films, at 150-180° C. for one hour. MYLAR and TEFLON are suitable protective films to protect the sample from the platens. Aluminum foil must never be used (maleic anhydride reacts with aluminum). Platens should be under pressure (~10 ton) for about five minutes. The sample is allowed to cool to room temperature, placed in an appropriate sample holder, and then scanned in the FTIR. A background scan should be run before each sample scan, or as needed. The precision of the test is good, with an inherent variability of less than ±5%. Samples should be stored with desiccant to prevent excessive hydrolysis. Moisture content in the product has been measured as high as 0.1 weight percent. The conversion of anhydride to acid however is reversible with temperature, but may take up to one week for complete conversion. The reversion is best performed in a vacuum oven at 150° C.; a good vacuum (near 30 inches Hg) is required. If the vacuum is less than adequate, the sample tends to oxidize, resulting in an infrared peak at approximately 1740 $cm^{-1}$, which will cause the values for the graft level to be too low. Maleic anhydride and acid are represented by peaks at about 1791 and 1712 $cm^{-1}$, respectively.

Flex Mandrel

Flex Mandrel testing was completed according to the Mandrel Bend Test Method (ASTM D3111-99). Test strips were "1 cm wide by 1.5 mm thick" adhesive strips, which were bent over a mandrel (diameters of 3 mm, 6 mm, and 15 mm) The test was repeated with a smaller diameter mandrel, until the adhesive failed on bending. The flexibility of the adhesive is indicated by the smallest diameter, over which 4 out of 5 specimens did not break. Testing was performed at various temperatures. Results at each mandrel diameter may be reported as the percentage of test strips that did not fail.

DMTA

DMTA was measured using RSA III, TA Instruments (used 5-8 mg sample). The temperature was increased from −80V to 60° C., with a ramp rate 3.0° C./min. The Tg of each blend was recorded and identified as in the peak of E" of the DMTA plots.

EXPERIMENTAL

The polymers used in this study are listed in Table 1. Tackifiers are shown below in Table 2.

TABLE 1

Polymers used in the Experimental Adhesive (HMA) Formulations

| Polymer | Calculated I2* at 190° C. (g/10 min) | Melt Viscosity at 177° C. (cP) | Density (g/cm3) | Mw$^a$ (g/mol) | Mn$^a$ (g/mol) | Mw/Mn$^a$ |
|---|---|---|---|---|---|---|
| AFFINITY GA 1900$^b$ | 1000 | 8200 | 0.870 | 20000 | 9523 | 2.1 |
| AFFINITY GA 1000R$^c$ | 660 | 13000 | 0.878 | | | 2.7 |

$^a$GPC results.
$^b$Available from The Dow Chemical Company. Ethylene/octene copolymer.
$^c$Available from The Dow Chemical Company. Maleic Anhydride (MAH) functionalized ethylene/octene copolymer.
*Melt index may be calculated from the following equation (See U.S. Pat. No. 6,335,410): I2(190° C./2.16 kg) = $3.6126[10^{(log(\eta)-6.6928)/-1.1363}] - 9.3185l$, where $\eta$ = melt viscosity, in cP, at 350° F. (177° C.).

TABLE 2

Tackifiers

| Product | Esterification | Hydrogenation | Softening point, ° C. | Tg, ° C. |
|---|---|---|---|---|
| FORAL 105-E$^a$ | Pentaerythritol ester | Hydrogenated Gum Rosin$^e$ | 101 | 54 |
| FORALYN 90$^a$ | Glycerol ester | Hydrogenated Gum Rosin$^e$ | 82 | 46 |
| PERMALYN 6110$^a$ | Pentaerythritol ester | Gum Rosin$^d$ | 103 | 54 |
| KTP 95$^b$ | ester | Modified Gum Rosin | 90-98 | 42 |

$^a$Available from Eastman Chemical.
$^b$Available from Komotac; non-hydrogenated.
$^c$Fully/Highly hydrogenated.
$^d$Non-hydrogenated; see WO 2005/014752.

The inventive work evaluated the compatibility and properties of different rosin tackifiers with AFFINITY GA 1900 and AFFINITY GA 1000R (MAH-grafted). The target was to use MAH-grafted polymer to enhance the compatibility with rosin tackifier to some useful level. The adhesion of compositions containing AFFINITY GA 1900 and AFFINITY GA 1000R with compatible tackifiers was also examined.

Adhesive Formulations

Components for the adhesive compositions were weighed into an aluminum container, and preheated in an oven, at 180° C., for one hour. The components in the container were then mixed in a heated block at 180° C. for 30 minutes, with a "Paravisc style" mixer head at 100 RPM. Each adhesive composition contained the following: polymer, wax, and tackifier resin. See Tables 5-8 for the adhesive formulations.

The wax used was SASOLWAX H1, a Fischer-Tropsch wax, supplied by Sasol Wax. IRGANOX 1010 (I1010) was used as antioxidant.

Compatibility Test

The compatibility of the polymer and tackifier was estimated by two different methods. The first method used a visual inspection of the clarity of the polymer and tackifier composition at room temperature. This method is a convenient and practical method that is commonly used in industry. The compatibility was further examined by the thermal and adhesive performance of the composition. Another, relatively simple method is to measure Tg of a polymer-tackifier composition. In case of a compatible tackifier, the Tg of polymer and tackifier composition will increase (its storage modulus (G') will be decrease).

Visual Inspection

A composition of polymer(s) and tackifier (1 tol by weight) was heated and mixed at 177° C. for 30 minutes, then cooled down to room temperature. The clarity of the composition was observed at room temperature (RT), and recorded in Table 3.

Compositions of fully hydrogenated rosin ester, FORAL 105E, with EVA, GA 1000 and GA 1000R resulted in good clarity. Signs of incompatibility appeared in compositions containing other hydrogenated and some non-hydrogenated rosin tackifiers. With rosin tackifier, FORALYN 90, the "GA 1000R composition" showed improved clarity, as compared with the "GA 1900 composition."

Compositions containing GA 1900 or GA 1000R and the non-hydrogenated PERMALYN 6110 were opaque, indicating their incompatibility with PERMALYN 6110. The composition containing rosin tackifier KTP 95 and GA 1000R had good clarity, indicating maleation boosted the compatibility with KTP 95. The GA 1900 (without MAH modification) had less compatibility with KTP 95.

From the visual inspection results, it was discovered that the hydrogenation level and esterification group of a rosin ester tackifier both influence the compatibility of the polymer/tackifier composition. It was discovered that AFFINITY GA 1000R had improved compatibility with fully hydrogenated and non-hydrogenated rosin tackifiers. The GA 1000R was partially replaced by 20% of GA 1900, and blended with rosin tackifier. The polymers (GA 1000R and GA 1900) and tackifier ratio in the blend still remained as 1:1, which was GA 1000R/GA 1900/Rosin tackifier=40%/10%/50%. Partial replacement of GA 1000R by GA 1900 (20 wt % of replacement in the compositions) also showed good compatibility with FORAL 105-E, KTP 95 or FORALYN 90.

The "GA 1900/GA 1000R/rosin tackifier compositions" had good clarity. Compositions containing FORAL 105-E, KTP 95 or FORALYN 90, and GA 1000R and/or GA 1900, were further analyzed by DMTA.

TABLE 3

The compatibility classified by clarity of 1:1 polymer/tackifier blends at RT

|  | EVA | AFFINITY GA 1900 | AFFINITY GA 1000R | AFFINITY GA 1000R/ AFFINITY GA 1900 (80 wt %/ 20 wt %) |
|---|---|---|---|---|
| FORAL 105-E | Transparent | Transparent | Transparent | Transparent |
| FORALYN 90 | Transparent | Opaque | Transparent | Transparent |
| KTP 95 | Transparent | Opaque | Transparent | Transparent |
| PERMALYN 6110 | Transparent | Opaque | Opaque | Opaque |

DMTA Test

A composition of polymer and tackifier (1 to 1 by weight) was heated and mixed at 177° C. for half an hour, then compressed at 180° C. for 15 seconds, and trimmed to a "0.5 mm thick" sample. Besides rosin ester tackifiers, a "1:1 blend" of GA 1900 with hydrogenated hydrocarbon tackifier EASTOTAC H115 W was also tested as a reference, as this polymer/tackifier combination is known to have very good compatibility. The Tg of each "1:1 blend" of polymer and tackifier is listed in Table 4.

TABLE 4

The compatibility classified by Tg of 1:1 polymer/tackifier blends at RT

|  | AFFINITY GA 1900 | AFFINITY GA 1000R | AFFINITY GA 1000R/ AFFINITY GA 1900 (80 wt %/20 wt %) |
|---|---|---|---|
| EASTOTAC H115W (Reference) | −29° C. | −29° C. | −29° C. |
| FORAL 105-E | −29° C. | −29° C. | −31° C. |
| FORALYN 90 | −35° C. | −30° C. | −31° C. |
| KTP 95 | −34° C. | −30° C. | −30° C. |

The Tg of the "EASTOTAC H115 W/AFFINITY GA 1900 composition" was around −29° C., which is used as the benchmark of good compatibility between polymer and tackifier. The Tg each of the GA 1900 and GA 1000R compositions, with FORAL 105-E, were both at around −29° C., which were close to that of the reference GA 1900/EASTOTAC H115 W composition. These results indi-cated that GA 1900 and GA 1000R were both compatible with fully hydrogenated rosin tackifier FORAL 105-E. AFFINITY GA 1000R showed improved compatibility with KTP 95, compared with GA 1900. The Tg of the "GA 1000R/KTP 95 composition" was also at around −30° C., which was close to that of the "EASTOTAC H115 W/AFFINITY GA 1900 composition," and 4° C. higher than that of the "GA 1900/KTP 95 composition." Similarly, compared with the "GA 1900/FORALYN 90 composition," a 5° C. increase in Tg was observed for the "GA 1000R/FORALYN 90 composition," which was −30° C.

The Tg of the "GA 1000R/GA 1900/Rosin tackifier compositions" didn't change much from that of "GA 1000R/Rosin tackifier compositions." For the compositions shown in Table 4, such Tg change was ≤1° C. These results indicated that the compatibility of each of the "GA 1000R/GA 1900/Rosin tackifier compositions" was close to that of the corresponding "GA 1000R/Rosin tackifier compositions."

The DMTA results were consistent with visual findings, both indicating that AFFINITY GA 1000R brought better compatibility with fully and non-hydrogenated rosin tackifiers. It is expected that AFFINITY GA 1000R will also have better compatibility with partially hydrogenated rosin tackifiers. All these results indicate that the MAH-grafted polymer promotes additional plasticization of tackifiers, especially tackifiers with unsaturation and aromatic groups (fully, partial or non hydrogenation). Some of the rosin tackifiers, which had limited compatibility with AFFINITY GA 1900, became usefully compatible with AFFINITY GA 1000R.

Adhesive Performance

Based on the above compatibility test results, tackifiers FORAL 105-E, FORALYN 90 and KTP 95 were further evaluated for adhesive performance, in order to better understand how the compatibility improvements will enhance the adhesion performance.

Performance Test on Adhesives Using Hydrogenated Tackifier FORAL 105-E

Table 5 shows the adhesive properties of fully hydrogenated tackifier FORAL 105-E, formulated with different polymers, EVA, GA 1900 and GA 1000R. The data in Table 5 demonstrates that AFFINITY GA 1900 and AFFINITY GA 1000R offered better performances than EVA adhesive, especially for Heat Stress and "fiber tear at 60° C." The data also show that GA 1900 and GA 1000R resulted in similar adhesive performances, as both polymers had good compatibility with fully hydrogenated tackifier FORAL 105-E.

TABLE 5

Adhesive Performances using FORAL 105-E with Different Polymers - EVA, AFFINITY GA 1900 and AFFINITY GA 1000R (Amounts in wt %)

| 40% Polymer 35% FORAL 105-E 24.5% SASOLWAX H1 0.5% IRGANOX 1010 | Melt Viscosity @ 177° C. mPa · s | SAFT ° C. | PAFT ° C. | Fiber Tear, % (Hard to Bond Substrate*) | | | Passing Heat Stress ° C. | Flex Mandrel, % (3 mm) | |
|---|---|---|---|---|---|---|---|---|---|
| | | | | −17° C. | RT | 60° C. | | −17° C. | RT |
| EVA | 667 | 105 | 59 | 80 | 76 | 65 | 35 | 100 | 100 |
| GA1900 | 611 | 100 | 60 | 88 | 100 | 90 | 57.5 | 80 | 100 |
| GA1000R | 708 | 101 | 65 | 90 | 100 | 92 | 57.5 | 100 | 100 |

*BOPP Coated Kraft.

Performance Test on Adhesive Using Tackifier FORALYN 90

Table 6 shows adhesive performances using hydrogenated tackifier FORALYN 90 formulated with different polymers, GA 1900 and GA 1000R. A reference adhesive formulation using 40% GA1900 and 35% EASTOTAC 100 W was also tested, to compare its performance with adhesives made using rosin based tackifiers. This reference formulation had good adhesive properties. The data shown in Table 6 illustrate that GA 1000R helped to improved overall adhesive performance. In addition to an increase on PAFT, there was a significant improvement on flexibility at room temperature and at −17° C. The adhesive using GA 1000R was flexible at room temperature and −17° C., while cracking of adhesive strips, formed from the adhesive containing GA 1900, was observed at same temperatures. It is believed that the improved compatibility between FORALYN 90 and GA 1000R contributed to better adhesive flexibility. The overall adhesive performance of AFFINITY GA 1000R and FORALYN 90 was as good as the reference formulation based on GA1900 and EASTOTAC 100 W.

TABLE 6

Adhesive Performances using FORALYN 90; Different Polymers - AFFINITY GA 1900 and AFFINITY GA 1000R (Amounts in wt %)

| 40% Polymer 35% FORALYN 90 24.5% SASOLWAX H1 0.5% IRGANOX 1010 | Viscosity @ 177° C. mPa · s | SAFT ° C. | PAFT ° C. | Fiber Tear, % (Regular Cardboard*) | | | Passing Heat Stress ° C. | Flex Mandrel, % (3 mm) | |
|---|---|---|---|---|---|---|---|---|---|
| | | | | −17° C. | RT | 60° C. | | −17° C. | RT |
| GA1900 | 554 | 100 | 56 | 86 | 95 | 88 | 52.5 | 0 | 20 |
| GA1000R | 701 | 103 | 63 | 88 | 98 | 92 | 55 | 100 | 100 |
| 40% GA1900, 35% EASTOTAC 100W | 593 | 104 | 61 | 100 | 100 | 100 | 40 | 100 | 100 |

*Standard Regular Slotted Cartons (Standard RSC), available from "papermart.com.".

Performance Test on Adhesive Using Tackifier KTP

Table 7 shows adhesive performance of tackifier KTP 95 (non-hydrogenated) formulated with different polymers (GA 1900 and GA 1000R). Again adhesive formulation using 40% GA1900 and 35% EASTOTAC 100 W was used as the reference formulation. Again the composition containing the GA 1000R has a pronounced improvement on flexibility at room temperature and −17° C., indicating improved compatibility in the formulation. The overall adhesive performance using AFFINITY GA 1000R and KTP 95 was as good as the reference formulation, based on GA1900 and EASTOTAC 100 W.

TABLE 7

Adhesive performances using KTP 95 with different polymers - AFFINITY GA 1900 and AFFINITY GA 1000R (Amounts in wt %)

| 40% Polymer 35% KTP 95 24.5% SASOLWAX H1 0.5% IRGANOX 1010 | Viscosity @ 177° C. mPa · s | SAFT ° C. | PAFT ° C. | Fiber Tear, % (Regular Cardboard) | | | Passing Heat Stress ° C. | Flex Mandrel, % (3 mm) | |
|---|---|---|---|---|---|---|---|---|---|
| | | | | −17° C. | RT | 60° C. | | −17° C. | RT |
| GA1900 | 516 | 103 | 57 | 100 | 100 | 100 | 40 | 0 | 0 |
| GA1000R | 585 | 104 | 61 | 100 | 100 | 100 | 45 | 100 | 100 |
| 40% GA1900, 35% EASTOTAC 100W | 593 | 104 | 61 | 100 | 100 | 100 | 40 | 100 | 100 |

Next, the ratio of the polymer and tackifier KTP 95 was changed, as shown in the formulations listed in Table 8. As seen in Table 8, the compositions containing the GA 1000R and the KTP95 had better adhesion results.

TABLE 8

Adhesive performances using KTP 95 with different polymer content
(Amounts in wt %)

| 24.5% SASOL WAX H1 0.5% IRGANOX 1010 | Viscosity @ 177° C. mPa·s | SAFT °C. | PAFT °C. | Fiber Tear, % (Regular Cardboard) | | | Passing Heat Stress °C. | Flex Mandrel, % (3 mm) | |
|---|---|---|---|---|---|---|---|---|---|
| | | | | −17° C. | RT | 60° C. | | −17° C. | RT |
| 35% GA 1900 40% KTP95 | 380 | 104 | 61 | 97 | 100 | 96 | 40 | 20 | 60 |
| 40% GA 1900 35% KTP95 | 516 | 103 | 57 | 100 | 100 | 100 | 40 | 0 | 0 |
| 45% GA 1900 30% KTP95 | 705 | 102 | 50 | 94 | 100 | 73 | 40 | 0 | 0 |
| 35% GA 1000R 40% KTP95 | 528 | 102 | 62 | 100 | 100 | 100 | 45 | 60 | 100 |
| 40% GA 1000R 35% KTP95 | 585 | 104 | 61 | 100 | 100 | 100 | 45 | 100 | 100 |
| 45% GA 1000R 30% KTP95 | 783 | 104 | 54 | 100 | 100 | 95 | 45 | 100 | 100 |

It was discovered that overall, compositions containing the AFFINITY GA 1000R and the preferred tackifiers, showed a significant improvement on compatibility, and had increased the performance in all formulations, especially in terms of heat resistance and flexibility at room temperature and low temperature (−17° C.). The performances of adhesives compositions reached the same level of performance as the reference formulation.

Formulations with AFFINITY GA 1000R or Other MAH Grafted Polymers

Adhesive performance was examined using another MAH grafted polymer (EPOLENE C-18) formulated with rosin tackifier were examined. The EPOLENE C-18 (density of 0.905 g/cc, and melt viscosity of 2800 cP (at 177° C.), available from Westlake Chemical) is the MAH functionalized, low molecular weight polyethylene, formed from an ethylene-based polymer polymerized under high pressure polymerization (see for example U.S. Pat. No. 5,763,516). From the visual inspection, 1:1 blends of EPOLENE C-18 and FORAL 105-E showed good clarity at room temperature (RT), indicating the good compatibility between EPOLENE C-18 and FORAL 105-E.

Two formulations were examined for adhesive performances. Formulation 1 (F1) and Formulation 2 (F2) both contained 40 wt % of MAH functionalized materials (EPOLENE C-18 in F1, and AFFINITY GA 1000R in F2), 34.5 wt % of rosin tackifier FORAL 105-E and 25 wt % of wax. The amounts of components in F1 and F2 were chosen for the purpose of producing compositions for adhesion testing. See Table 9.

F1: 40 wt % EPOLENE C-18, 34.5 wt % FORAL 105-E, 25 wt % SASOLWAX H1, 0.5 wt % I1010;
F2: 40 wt % AFFINITY GA 1000R, 34.5 wt % FORAL 105-E, 25 wt % SASOLWAX H1, 0.5 wt % I1010.

As shown in Table 9, with the same content of MAH functionalized polymer in the formulation, the composition containing the AFFINITY GA 1000R had much better adhesion performance and flexibility property. Formulation 1, containing the EPOLENE C-18, had 0% of fiber tear at −17° C., RT and 60° C. Formulation 2, containing the GA 1000R, demonstrated ≥90% of fiber tear at −17° C., RT and 60° C. The different adhesion performance between Formulation 1 and Formulation 2 was significant. Formulation 2 also showed much better flexibility in flex mandrel (a test that measures the flexibility of the adhesive at different temperatures) at both room temperature and −17° C. Compared with EPOLENE C-18, AFFINITY GA 1000R resulted in better overall adhesive performance.

TABLE 9

Performances of AFFINITY GA 1000R vs. EPOLENE C-18 (wt %)

| | Fiber Tear, % (Hard to Bond Substrate) | | | Flex Mandrel, % (3 mm) | |
|---|---|---|---|---|---|
| | −17° C. | RT | 60° C. | −17° C. | RT |
| F1 40% EPOLENE C-18, 34.5% FORAL 105-E, 25% SASOLWAX H1, 0.5% I 1010 | 0 | 0 | 0 | 0 | 40 |
| F2 40% GA 1000R, 34.5% FORAL 105-E, 25% SASOLWAX H1, 0.5% I 1010 | 90 | 100 | 92 | 100 | 100 |

*BOPP Coated Kraft.

The invention claimed is:

1. A composition comprising the following components:
   A) a maleic anhydride functionalized ethylene/octene copolymer comprising the following properties:
      i) a melt viscosity (at 177° C.) less than, or equal to, 50,000 cP; and
      ii) a density from 0.855 to 0.895 g/cc;
      iii) a molecular weight distribution (Mw/Mn) greater than, or equal to, 2.5;
   B) a rosin-based tackifier selected from the group consisting of a fully hydrogenated pentaerythritol ester, a fully hydrogenated glycerol ester, and combinations thereof;

C) an ethylene/octene copolymer having
  (i) a molecular weight distribution (Mw/Mn) less than, or equal to, 2.3,
  (ii) a melt viscosity (at 177° C.) from 5,000 cP to 40,000 cP;
wherein the weight ratio of component A to component C is 4:1 and the weight ratio of components A and C to component B is 1:1; and
the composition is transparent.

2. The composition of claim 1, wherein the composition comprises ≥70 wt % of the sum weight of component A and component B, based on the weight of the composition.

3. The composition of claim 1, wherein the ethylene/octene copolymer of component C has a density from 0.855 to 0.885 g/cc.

4. The composition of claim 1, wherein the composition has a melt viscosity (at 177° C.) from 100 to 2000 mPa·s.

5. An article comprising the composition of claim 1.

6. The article of claim 5, further comprising a substrate.

7. The article of claim 6, wherein the substrate is selected from the group consisting of the following: a coated substrate, a recycled paper, and combinations thereof.

8. The article of claim 6, wherein the substrate is selected from the group consisting of the following: a wax coated Kraft or carton, a polyethylene coated Kraft or carton, a biaxially oriented polypropylene (BOPP) film laminated Kraft or carton, a polypropylene (PP) film laminated Kraft or carton, a polyethylene terephthalate (PET) film laminated Kraft or carton, a clay coated Kraft or carton, a lacquer coated Kraft or carton, and combinations thereof.

9. The composition of claim 1, wherein the composition comprises ≥75 wt % of the sum weight of component A and component B, based on the weight of the composition.

* * * * *